United States Patent [19]
Kohara

[11] 3,891,978
[45] June 24, 1975

[54] MAGNETIC DOMAIN PROPAGATING CIRCUIT

[75] Inventor: Haruki Kohara, Tokyo, Japan

[73] Assignee: Nippon Electric Company, Limited, Tokyo, Japan

[22] Filed: Dec. 28, 1973

[21] Appl. No.: 429,340

[30] Foreign Application Priority Data

Dec. 29, 1972 Japan .................................. 47-1855

[52] U.S. Cl. ...................... 340/174 TF; 340/174 SR
[51] Int. Cl. ...................... G11c 11/14; G11c 19/00
[58] Field of Search ...................... 340/174 TF, 5 R

[56] References Cited

UNITED STATES PATENTS

| | | | |
|---|---|---|---|
| 3,516,077 | 6/1970 | Bobeck et al. | 340/174 TF |
| 3,602,911 | 8/1971 | Kurtzig | 340/174 TF |
| 3,678,479 | 7/1972 | Owens | 340/174 TF |
| 3,693,177 | 9/1972 | Owens | 340/174 TF |
| 3,699,551 | 10/1972 | Fischer | 340/174 TF |
| 3,828,330 | 8/1974 | Parzefall | 340/174 TF |

*Primary Examiner*—Stanley M. Urynowicz, Jr.
*Attorney, Agent, or Firm*—Sughrue, Rothwell, Mion, Zinn and Macpeak

[57] ABSTRACT

A novel ferromagnetic piece is provided for magnetic domain circuits. Each piece is capable of retaining a domain at a specific point therein even in the absence of an in-plane magnetic field. Propagation between two adjacent pieces can be in either direction without reversing the direction of a rotational in-plane magnetic field. Each piece is point-symmetrical and has projections which form magnetic poles in the presence of a properly directed in-plane magnetic field.

9 Claims, 28 Drawing Figures

PATENTED JUN 24 1975 SHEET 3 3,891,978

MAGNETIC DOMAIN PROPAGATING CIRCUIT

BACKGROUND OF THE INVENTION

The present invention relates to a cylindrical magnetic domain (referred to as bubble domain hereunder) propagating circuit comprising a magnetic material (sheet) such as orthoferrite, and a plurality of ferromagnetic pieces disposed adjacent to the sheet.

This invention can be used as a basic element to form a logic or memory device and hence, can find broad applications in memory and logic circuits for information handling systems such as computers, pattern recognition apparatus, and voice recognition equipment and the like.

It is known in the art that the use of bubble domains generated in the so-called orthoferrite containing rare earth elements or in other magnetic materials makes logic and memory functions possible. The general properties of the orthoferrite are described in detail in "Bell System Technical Journal," Oct. issue, 1967, pages 1901 to 1925. The so-called "T-bar system" suited for use with the orthoferrite to form logic and memory circuits, is described in a paper published on pages 25.2 and 25.3 of "Abstracts of the Intermag Conference," Apr. issue, 1969.

In the prior art domain propagating circuit, a pole N or pole S produced in a piece of ferromagnetic material disposed adjacent to the sheet has been utilized to move a bubble domain. However, in the prior art circuit, such ferromagnetic piece is asymmetrical in shape for the convenience of unidirectional propagation of the domain. This therefore has made it difficult to realize a practical and functional two-dimensional domain propagating circuit or logic circuit. In addition, in the prior art, there are such disadvantages as the need for some extra ferromagnetic pieces at the corner and/or branch points of the circuits, unavoidably enlarging the size of the ferromagnetic piece to maintain stable domain propagation in the area of the corner and/or branch points, with the efficient use of the area on the magnetic device limited and with extra conductor loops required to realize such circuits. These disadvantages make it impossible to attain substantial cost reduction. In particular, if various kinds of ferromagnetic pieces are used in the domain propagating circuit, many problems is designing and constructing the circuit have arisen inevitably. Moreover, in the prior art circuit, an additional in-plane biasing magnetic field has been indispensable because the circuit becomes vulnerable to external disturbance when an in-plane magnetic field is removed. Also, the propagation of the domain from one relaying point to the adjacent relaying point is permitted only in a limited direction of the in-plane magnetic field. From a construction standpoint, the conventional circuit has restrictions on the movement of domains.

It is, therefore, one object of this invention to provide a domain propagating circuit free from the above-mentioned disadvantages of the prior art circuits.

SUMMARY OF THE INVENTION

According to the present invention, there is provided a magnetic domain propagating circuit comprising: a sheet of magnetic material capable of retaining domains; means for applying a biasing magnetic field normal to the sheet; means for generating in-plane magnetic fields parallel with the surface of the sheet; and ferromagnetic pieces capable of generating magnetic poles variable with lapse of time under the influence of the in-plane magnetic fields, the ferromagnetic pieces each having substantially point-symmetric shape disposed adjacent to the sheet so that the individual pieces may serve as relaying points for holding the domains and may form a plurality of propagation paths to selectively connect the relaying points depending on the direction and magnitude of the in-plane magnetic fields applied.

According to the present invention, one-and two-dimensional domain propagating circuits, and logic circuits can be put into practical use by the use of one standardized ferromagnetic material of substantially point-symmetrical shape. As a result, the circuit construction and design become simpler, which leads to higher speed operation, with the magnetic material more efficiently used, to permit a highly integrated and low-cost circuit to be produced. With the invention, the individual ferromagnetic pieces can be employed both as the relaying points at which bubble domains are retained stably, and as a plurality of propagation paths which allow the domains to be moved in an arbitrary direction, and the direction of the domain propagation can be controlled by an in-plane magnetic field applied. For these reasons, the invention makes it possible to manufacture a domain propagating circuit capable of stably operating under controls with minimum power.

BRIEF DESCRIPTION OF THE DRAWINGS

The present invention will now be described more in detail in conjunction with the accompanying drawings, wherein:

FIG. 2 shows a schematic diagram of a domain propagating circuit wherein

DETAILED DESCRIPTION OF THE PREFERRED EMBODIMENTS

Some rules of illustration applied throughout this specification are given here before entering into detailed description of this invention.

Figure 1:
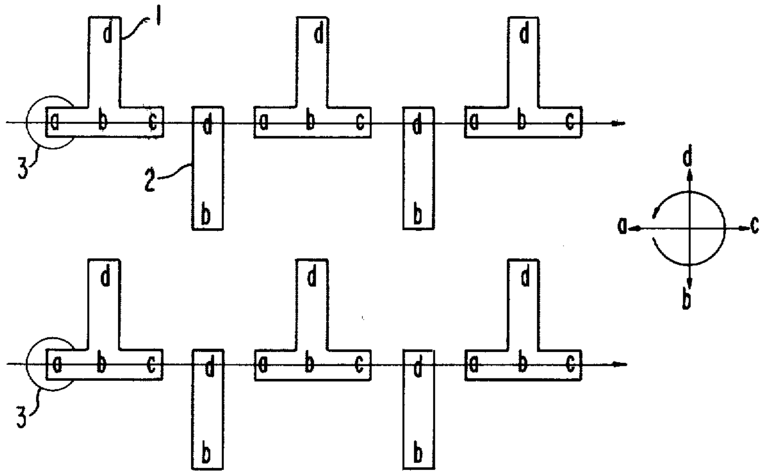
FIG. 1 shows a diagram of the well known bubble domain propagating circuit for explaining some rules of illustration which are applied throughout the instant specification and drawings.

In FIG. 1 which shows a plan view of the surface of a sheet (not shown) of magnetic material (bubble domain sheet) such as of orthoferrites in which bubble domain can be held and moved, a plurality of ferromagnetic pieces for defining a propagating channel for the bubble domains are disposed on the top surface of the sheet of magnetic material. The symbols shown by the arrows at the right-hand portion indicate the directions of an in-plane rotating magnetic field applied parallel with the plane of the sheet. A biasing magnetic field is applied substantially, normal to the plane of the sheet, in other words, in the direction from the lower surface of the paper of the drawing to the upper surface. Therefore, the direction of magnetization of the bubble domain is in the direction from the upper surface of the paper to the lower surface. It is assumed that the in-plane magnetic field rotates in the sequence of *a-b-c-d-a-b-c-d-* . . . . These assumptions will be applied to other drawings.

At a time point where the rotating magnetic field is in the direction of the arrow *a*, a magnetic pole N exists at the position *a* of a ferromagnetic material piece 1. At the time points where the rotating magnetic field is in the directions *b*, *c* and *d*, the magnetic poles N exist at the positions *b*, *c* and *d* of the piece 1, respectively. When the rotating magnetic field in the directions *b* and *d* is applied to a piece 2, poles N exist respectively at the positions *b* and *d* of the piece 2. In case where the rotating magnetic field is in the directions *a* and *c*, no pole is generated in the piece 2. It is assumed that the time point at which the rotating magnetic field is in the directions *a* is time point *a*, and the position of the ferromagnetic piece where the domain is retained stably while the rotating magnetic field is in the direction *a*, is position *a*. Similar assumption is applicable to the directions *b*, *c* and *d* of the magnetic field.

In FIG. 1, the plan view of a bubble domain 3 is viewed. Since a magnetic field generated by the pole N of the piece coincides with the direction of magnetization of the domain 3, the domain 3 stays in the vicinity of the magnetic pole N. Accordingly, two bubble domains 3 are propagated along the positions *a-b-c-d-a-b-c-d-* . . . as the rotating magnetic field rotates counterclockwise. In this case, during one cycle of the rotating field, each domain shifts by one bit position, from one position *a* to the adjacent position *a*, from one position *b* to the adjacent position *b*, from one position *c* to the adjacent position *c*, or from one position *d* to the adjacent position *d*. The two adjacent positions *a* are located to be suitably separated from each other so that the two domains may not interfere with each other. Therefore, when the rotating magnetic field is in the direction *a*, no domains can be present in positions *b*, *c* and *d* located between the two adjacent positions *a*.

Figure 2A:
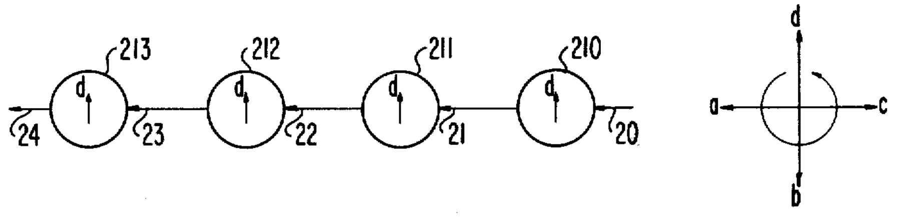
FIG. 2(A) shows a conventional domain propagating circuit.

In FIG. 2(A) shows a block diagram of a conventional domain propagating circuit as shown in FIG. 1, numerals 210 through 213 denote relaying points constituted of ferromagnetic pieces, each being capable of generating a magnetic pole N for retaining a bubble domain only in response to the direction along which the rotating magnetic field appears periodically. The connection between the relaying points is made by domain propagating paths 20 through 24 composed of ferromagnetic pieces, thus enabling a bubble domain to transfer from one relaying point to the adjacent point depending on the rotation of the rotating magnetic field. For example, a domain retained at the relaying point 210 at time point *d* leaves the point 210 and goes through the propagation path 21 to the next relaying point 211 at another time point *d* being one cycle behind the first time point *d* as the rotating magnetic field rotates, and is retained therein. In other words, the domain passes through each relaying point at each cycle of the rotating field. In order that the domain is kept retained at a relaying point, it is necessary to hold the state of the in-plane magnetic field applied at time point *d*.

Now considering the structure of FIG. 1 corresponding to FIG. 2(A), the relaying point of FIG. 2(A) corresponds to the ferromagnetic piece of bar shape of FIG. 1, or more specifically to the point *d*. Also, the domain propagation path referred to in FIG. 2(A) corresponds to the positions *a*, *b* and *c* on the T-shaped ferromagnetic piece 1 of FIG. 1. The domain is propagated from one position *d* (relaying point) to the adjacent position *d* during one cycle of the rotating magnetic field.

In such a conventional domain propagating circuit, the rotating magnetic field in a particular direction is needed to retain a bubble domain at a relaying point, and only one propagation path is formed between the two adjacent relaying points. As a result, the propagation of the domain is performed in only one direction depending on the rotation of the magnetic field. For these reasons, means for retaining a domain at a relaying point such as, for example, means for applying a biasing in-plane magnetic field in direction *d*, must be present, and the direction of the rotating field must be reversed in order to reverse the direction of propagation. Particularly, if the rotating magnetic field is reversed at a high frequency, mis-operation is liable to be caused. To solve this problem, it is desired to provide a means for changing the direction of the domain propagation without reversing the rotating magnetic field. With the prior art domain propagating circuit as it stands now, there are difficulties in making a practical domain propagating circuit of two-dimensional configuration eligible for applications to logic circuits and pattern processing circuits. An example of the two-dimensional domain propagating circuit is described in "Digests of the Intermag Conference," Apr. issue, 1972, page 15.2. This circuit is capable of propagating a domain but in one direction only, either laterally or longitudinally.

The present invention obviates the need for any extra means for holding the domain and permits the domain to be moved in an arbitrary direction without inverting the rotating magnetic field. With the domain propagating circuit of this invention, therefore, the two-dimensional configurations useful for logic circuits and pattern processing circuits can be made.

Figure 2B:
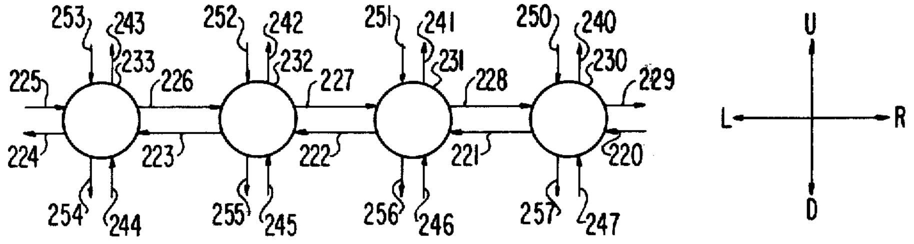
FIG. 2(B) shows a simple example of the domain propagating circuit of the invention.

In FIG. 2(B) which shows the simplest construction of the domain propagating circuit of this invention, one domain can be moved in four directions, e.g., in both upward and downward directions and leftward and rightward directions. Numerals 230 through 233 denote relaying points constituted of ferromagnetic pieces, and numerals 220 through 224, 225 through 229, 240 through 247, and 250 through 257 indicate domain propagation paths composed of ferromagnetic pieces to provide connections between the relaying points in the four directions. In contrast to the conventional circuit, the present domain propagating circuit is characterized in that one domain can be retained in each relaying point irrespective of the direction of the rotating magnetic field as long as the magnitude of the rotating field is controlled below a certain value. This makes it possible to dispense with means for holding the domain. A plurality of domain propagation paths are provided around the individual relaying points, thus forming two-way propagation paths, which are selected by the in-plane magnetic field whose magnitude is larger than a certain value which is applied in a predetermined direction. In FIG. 2(B), one domain can be retained at the relaying point under the condition that no in-plane magnetic field is applied thereto. The leftward propagation paths 220 through 224, the downward propagation paths 250 through 257, the rightward propagation paths 225 through 229, and the upward propagation paths 240 through 247, are selected by the in-plane magnetic field applied in L, D, R and U directions, respectively, and the domains are propagated in these directions. It is assumed that a domain is introduced from the right end of the propagation path 220 by the in-plane pulse magnetic field given in the L direction. This domain is held in the relaying point 230 after the in-plane magnetic pulse field is removed. Then, upon application of another in-plane pulse magnetic field in the L direction, the domain in the relaying point 230 is transferred to the relaying point 231 adjacent to the relaying point 230 through the propagation path 221.

Similarly, domains in each relaying point shift to the left bit-by-bit every time the in-plane magnetic field is applied in the L direction. When the pulse magnetic field is given in the U direction, a domain in each relaying point is sent to the upper adjacent relaying point through the propagation paths 240 to 243. At the same time, domains in the lower adjacent relaying points are introduced into each of the relaying points 230 to 233 through each of propagation paths 244 to 247, respectively. The pulse magnetic field in the U direction controls the shift of the upward domain pattern. In a similar manner, the pulse magnetic fields in the R and D directions control the rightward and downward shifts of domain patterns, respectively. For simplicity, FIG. 2(B) does not show the upper and lower adjacent relaying points.

The domain in each relaying point can be shifted in upper, lower, right or left direction by the pulse magnetic field applied in one of the four directions. The invention can be readily applied to achieve a two-dimensional domain propagating circuit, as well as to achieve a one-dimensional one. For this purpose, it is required that the relaying point and the domain propagation path must be constituted of ferromagnetic material piece with a shape that is symmetrical in the upper, lower, right and left directions. By this arrangement, a circuit for a two-dimensional array can be easily realized, with the result that the circuit design, manufacture and control may be simplified.

Figure 2C:
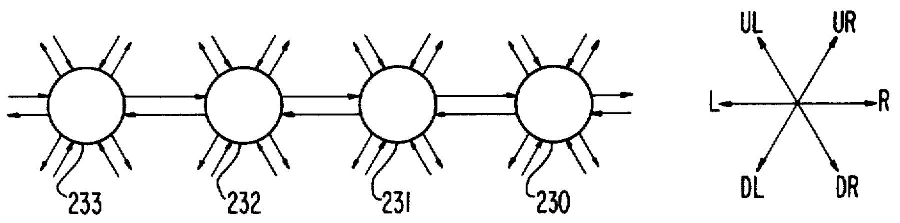
FIG. 2(C) shows a general construction of the domain propagating circuit of the invention.

In FIG. 2(C) which shows an example of the further advanced circuit of the invention based on the foregoing concept, the two-way domain propagation paths in 6 directions, right, left, upper right, upper left, lower right and lower left directions, are composed of ferromagnetic pieces for the relaying points 230 through 233, respectively. The domain transfer to the adjacent relaying point in each direction is controlled by pulse magnetic fields L, R, UL, UR, DL and DR. In a case where no pulse magnetic field is applied, the domain in each relaying point remains at the relaying point. In the arrangement as shown in FIG. 2(C), the ferromagnetic piece is in the shape of symmetry whereby the array configuration becomes simplified. Generally, the number of domain propagation paths can be arbitrarily determined, and the larger the number of the propagation paths, the better the circuit will function. Practically, it is much easier to construct the circuit with propagation paths of 4 to 6 directions taking the array configuration and accurate selection of paths into consideration. However, if such technical problems are solved, the number of the propagation paths may be increased.

In FIGS. 2(B) and 2(C), the directions of the pulse magnetic field, or L, D, R, U, UL, UR, DL and DR coincide with the directions of the domain propagation, but generally the direction of the pulse magnetic field is not always coincident with the propagation direction.

Figure 3A:
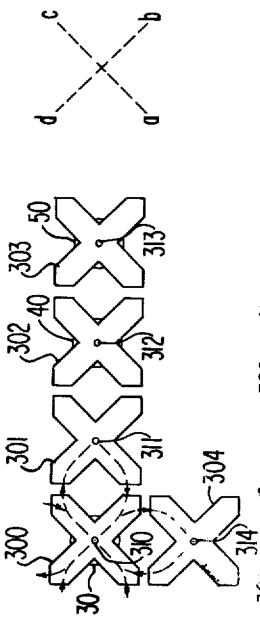
FIGS. 3A and 3H show diagrams of a first embodiment of this invention.

In FIGS. 3A to 3H which show the first embodiment of the invention corresponding to the circuit arrangement shown in FIG. 2(B), each of the ferromagnetic pieces 300 through 304 forms one cell comprising a single relaying point and several domain propagation paths to the adjacent relaying points in upper, lower, right and left directions. These cells are in substantially point-symmetrical shape, and central portions such as 310 through 314 are the relaying points wherein bubble domains are retained. The projected portions of each cell are the propagation paths leading to the adjacent cell. In FIG. 3A, the propagation paths on the cells 300, 301 and 304 are indicated by the solid lines, each cell has two-way propagation paths to the upper, lower, right and left adjacent cells. It is assumed here that bubble domains 30, 40 and 50 are held only at the relaying points 300, 302 and 303, and that no domains are present at other cells. When no pulse magnetic field is applied or a pulse magnetic field applied is small, the domains 30, 40 and 50 are kept retained therein. More specifically, the domains are stably maintained therein when the magnitude of the pulse magnetic field is smaller than 5 Oe under the conditions that yttrium orthoferrite material of 60 $\mu$ (microns) in thickness is used, the width of the propagation path is 40 $\mu$ (microns), the distance between the adjacent relaying points is 240 $\mu$ (microns), the clearance between the adjacent propagation paths is 40 $\mu$ (microns) the thickness of the ferromagnetic piece is 1 $\mu$ (micron) and the biasing magnetic fields is 38 Oe. Also, it is assumed that a domain pattern is retained at a relaying point in the absence of any pulse magnetic field applied thereto. The transfer of a domain from one cell to the adjacent cell is controlled through selection of the magnitude (or amplitude) and direction of the pulse magnetic field. The pulse magnetic field used for this purpose is an in-plane magnetic field in one of the four directions *a, b, c* and *d* as shown in FIGS. 3A to 3H.

Figure 3B:
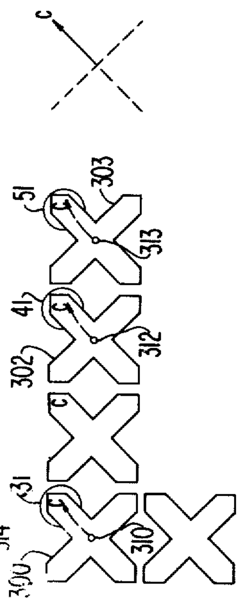
FIGS. 3I to 3L show diagrams for explaining the first embodiment more in detail.
Figure 3C:
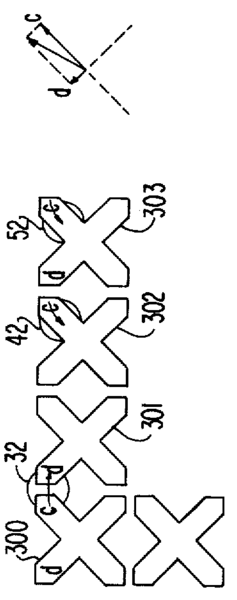

When a main pulse magnetic field is applied in direction *c* as shown in FIG. 3B from the initial state of FIG. 3A, a magnetic pole N is produced at position *c* on the propagation path coincident with the direction of the magnetic field applied whereby the domains 30, 40 and 50 are propagated to the position *c* and become domains 31, 41 and 51, respectively. Then, when a small pulse magnetic field in direction *d* whose amplitude is smaller than that of the direction *c* is additionally applied, a magnetic pole N smaller than that at the position *c* is generated at position *d'* on the propagation path coinciding with direction *d* on each cell as shown in FIG. 3C. As a result, the domain 31 at the position *c* of the cell 300 is expanded to its nearest position *d'* and becomes a domain 32. As illustrated there is no cell to the right of cell 303. Position *d'* of cell 303 is remote from the domain 51 and the magnetic pole N present at the position *c* is strong compared to the small magnetic pole N generated in the position *d'*. Thus, domain 51 is not propagated to the position $d'$ of cell 303, but is retained in the vicinity of the position $c$ of the cell 303.

Domain 42 on the cell 302 tends to move to the position $d'$ on the nearest cell 303. However, this domain receives a repelling force from the domain 52. As a result, the domain 42 remains in the vicinity of the position $c$ of the cell 302.

In this manner, the propagation of one domain is limited depending on whether the propagation path to the destination is formed or not, or whether a domain is retained in any position on the destination cell. These properties are effectively utilized for selectively moving or stopping the domain or for obtaining logic operation as illustrated in FIG. 3C.

Figure 3D:
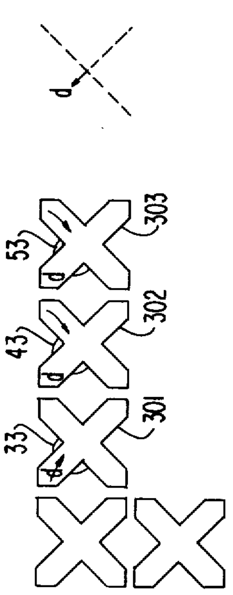

Then, when the main pulse magnetic field in the direction $c$ is removed and the small magnetic field in the direction $d$ is kept applied as shown in FIG. 3D, a domain 32 present between the cells 300 and 301 is attracted only by the magnetic pole N at the position $d'$ on the cell 301 and becomes a domain 33. In contrast, the domain 42 and a domain 52 on the cells 302 and 303, respectively, move toward the relaying point because the magnetic pole N to retain these domains at the position c is not present any more. The domains 42 and 52 are affected by the small magnetic pole N at the position d' and as a result, remain as domains 43 and 53, respectively, in the vicinity of the relaying point. This state is shown in FIG. 3D.

Figure 3E:
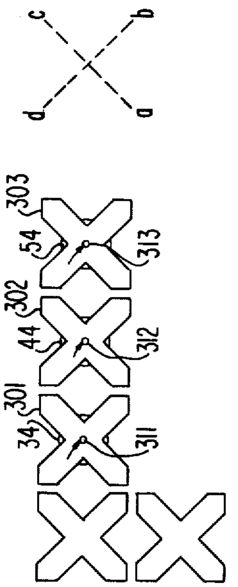

FIG. 3E shows the state in which the small pulse magnetic field in the direction $d$ is removed from the state of FIG. 3D. In FIG. 3E, the domains 33, 43 and 53 stay immovable at the individual relaying points on the cells and become domains 34, 44 and 54, respectively. In other words, when pulse magnetic fields in the direction $c$ and direction $d$ are applied in succession, the state of FIG. 3A shifts to the state of FIG. 3E, i.e., the domain state shifts by one bit in the right direction. In this operation, however, the domain pattern on the cells 302 and 303 whose right shift is limited remains unchanged.

Figure 3F:
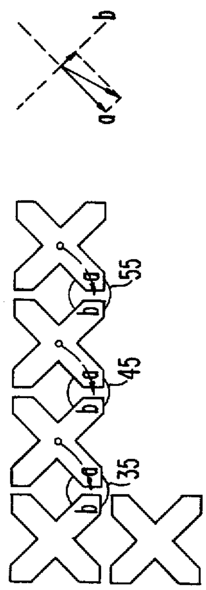
Figure 3G:
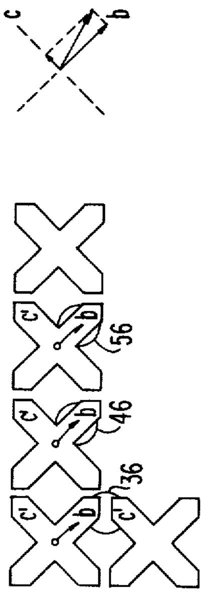
Figure 3H:
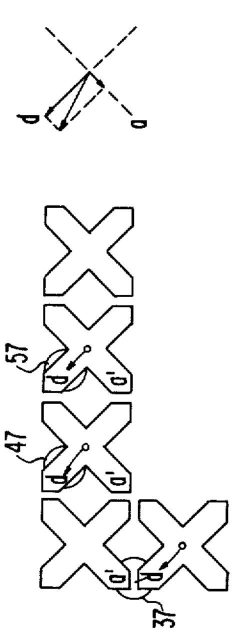

Similarly, the domain state can be shifted in left, upper and lower directions. For example, it is shifted toward the left direction by applying the main pulse magnetic field in the direction $a$ and the small pulse magnetic field in the direction $b$ in sequence as shown in FIG. 3F. The state shown in FIG. 3F shows that this operation is in progress. In the same way, the downward and upward shifts are done by applying the main pulse magnetic field in the direction $b$ and the small pulse magnetic field in the direction $c$, and the main pulse magnetic field in the direction $d$ and the small pulse magnetic field in the direction $a$, respectively. The states shown in FIGS. 3G and 3H show that these operations are in progress. In short, the two-way shift operations in four directions can be realized by suitably determining the magnitudes and directions of the pulse magnetic fields applied.

In the foregoing example, the shift controls are performed by the combination of the main pulse magnetic field and the small pulse magnetic field. This operation can be achieved by other combinations of the pulse magnetic fields. For example, the leftward, rightward, upward and downward shifts may be carried out by applying the $d$-direction main pulse magnetic field and the $c$-direction small pulse magnetic field in combination, the $b$-direction main pulse magnetic field and the $a$-direction small pulse magnetic field in combination, the $c$-direction main pulse magnetic field and the $b$-direction small pulse magnetic field in combination, and the $a$-direction main pulse magnetic field and the $d$-direction small pulse magnetic field in combination, respectively. As a result, the upper or lower shift mode may be switched to the left or right shift mode, depending on the application of small pulse magnetic field given in certain specific direction to a main magnetic field. In practice, for example, the magnitude of the main pulse magnetic field of 18 Oe, and that of the small pulse magnetic field of 4 Oe give a satisfactory operation to the present circuit.

The cell arrangement shown in FIGS. 3A to 3H is an example in which the adjacent cells are not always of regular configuration. For instance, in FIGS. 3B through 3E, the upper and left adjacent cells are absent with respect to the cell 300 and accordingly no domain shift is done in these directions. Therefore, in FIG. 3A, the domain in the cell 300 moves into no place but remains therein when a pulse magnetic field for upper or left shift is applied. However, this domain goes to the cell 304 in the lower adjacent place and into the cell 301 in the right adjacent place when pulse magnetic fields for lower and right shift are applied. Under this state, the state in which no domains appear in the cell 300, or, in other words, a space is produced, because no domains are introduced into the cell 300 from its upper and left adjacent cells. In this manner, under the limited domain shift from a cell in certain directions, when a magnetic pulse for shift is applied in a limited direction, the domain pattern on the limited cell is preserved therein, and only the domain pattern on the unlimited cell is shifted. By positively using this principle, domains in individual cells can be selectively shifted or retained. This control function can be effectively applied to the two-dimensional pattern processing circuits, memory and logic circuits without any control conductor loop connection for selectively controlling the domain shift. In the foregoing embodiment, although the main pulse magnetic field and the small pulse magnetic field are applied in succession, the two pulse magnetic fields may be applied simultaneously if necessary.

Figure 3I:
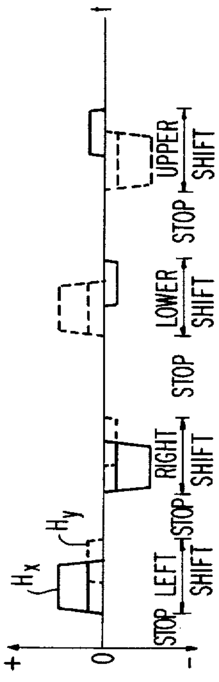
Figure 3J:
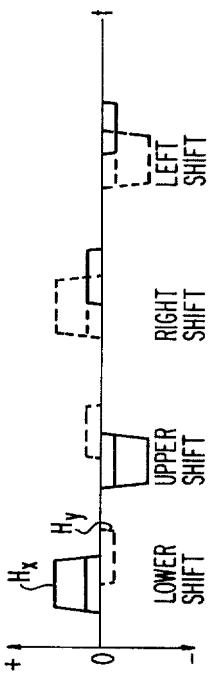
Figure 3K:
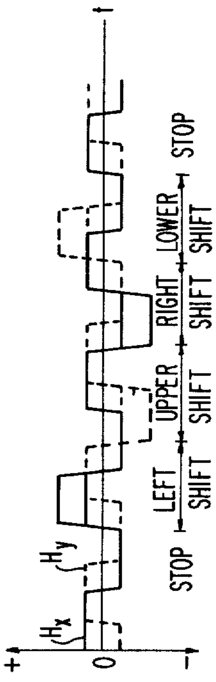

In FIGS. 3I to 3K which show several examples of the application of the pulse magnetic fields for performing the domain shifts, the pulse magnetic fields in the directions $a$ and $c$ correspond to the positive and negative of the magnetic field Hx which is generated by applying the current pulse to X-coil means (not shown for the simplicity of the drawings) provided in the vicinity of the magnetic sheet (not shown). More specifically, the pulse magnetic field in the direction $a$ corresponds to $Hx > 0$ and that in the direction $c$ to $Hx < 0$. In a similar manner, the pulse magnetic fields in the directions $b$ and $d$ correspond to the positive and negative of the magnetic field Hy which is generated by giving the current pulse to Y-coil means disposed perpendicular to the X-coil means (the pulse magnetic field in the direction $b$ corresponds to $Hy > 0$ and that in the direction $d$ to $Hy < 0$). Additionally, Hy is shown in the drawings in the broken line to define the superimposed state between H$x$ and H$y$ in time sequence. The axis in the lateral direction of the drawings indicates time sequence. Also, the magnetic field of large and small magnitudes (or amplitudes) of H$x$ and H$y$ correspond to the main magnetic pulse field and small magnetic pulse field in FIGS. 3A to 3H. The control of the upward, downward, rightward and leftward shift operations for domains is carried out by the combination of these pulse magnetic fields H*x* and H*y*.

In FIG. 3I, the time interval in which both Hx and Hy are not given shows the stopped state shown in FIGS. 3A and 3E. Also, the leftward shift is performed by applying the main pulse magnetic field H*x* and the small pulse magnetic field H*y* in the positive direction, while the rightward shift is carried out by giving the main pulse magnetic pulse H*x* and the small pulse magnetic field H*y* in the negative direction. On the other hand, the downward and upward shifts are made by applying the main pulse magnetic field H*y* and the small pulse magnetic field H*x* in the reverse directions with respect to each other. In addition, if the main pulse magnetic field H*x* or H*y* to be used is replaced by the small pulse magnetic field, these shift operations are not performed. FIG. 3J represents a different combination of the pulse magnetic fields. As can be seen the main pulse magnetic fields are the same as in FIG. 3I, but the small pulse magnetic fields are reversed. Nonetheless, the same four shift operations are made by the combination of the pulse magnetic fields of FIG. 3J.

Figure 3L:
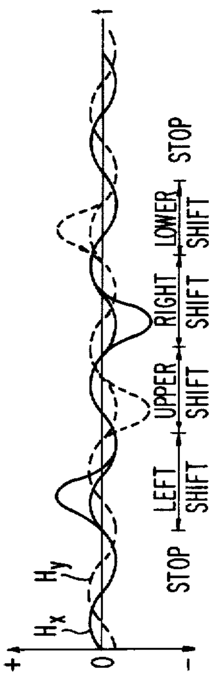

In FIGS. 3I and 3J, the so-called R-Z system (return to zero) is utilized, whereby the pulse magnetic fields H*x* and H*y* return to zero. However, the NRZ system (Non Return to Zero) may be employed in its place as shown in FIG. 3K. In this case, the stopped state in which the in-plane magnetic fields completely disappear does not occur. In addition, FIG. 3L shows the shift operations in a case where the magnetic fields of two sine waves are applied. The two sine waves differ in phase by 90°. As has been mentioned above, the four shift operations can be performed by the magnetic fields of any shapes or, in other words, rectangular shape, sine wave and the like if the relationship between the main magnetic field and the small magnetic field is maintained as in the above-mentioned examples. Even though the inplane magnetic fields of FIGS. 3K and 3I do not contain stop regions where no field exists, they nevertheless can properly be referred to generically as pulsed in-plane magnetic fields because they consist of square waves or sine waves modulated by pulses.

Figure 4A:
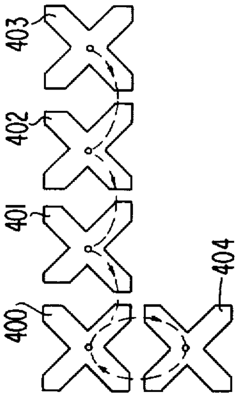
FIG. 4 shows a diagram of a second embodiment of this invention.
Figure 4B:
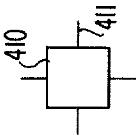
Figure 4C:
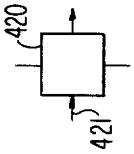
Figure 4D:
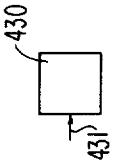

In FIG. 4 wherein FIG. 4(A) differs from FIG. 3 in that the domain pattern shift is compulsorily inhibited by shortening the length of the ferromagnetic piece corresponding to the propagation path for the rightward domain shift between cells 400 and 403. For this reason, the leftward shift operation is available between the cells 400 and 403, but no domain pattern shift takes place during the rightward shift operation. For example, as can be seen in FIG. 4, one or more of the upper projections of cells 401 and 402 are shorter relative to the other projections. Thus, the spacing between the upper adjacent projection of cells 400 and 401, 401 and 402, and 402 and 403, are greater than in the case of the lower projections. Thus, assuming the application of pulse magnetic fields as shown in FIGS. 3A through 3D to achieve a rightward shift, the gaps will be too large to allow a domain to move in the right shift direction. In FIG. 4, only the feasible shift path is indicated by the arrow mark. In this circuit, there are three modes of shift from one cell to the adjacent cell depending on the conditions of shift path; (1) the shift path is usable in both ways, (2) the shift path is usable in one way, and (3) the shift path is not available. These states are illustrated in FIGS. 4(B) and 4(D). The cells are indicated by boxes, the straight solid lines connecting the cells as shown by numeral 411 signify the feasibility of two-way shift, and the lines with arrows as shown by numeral 421 indicate the possibility of one-way shift in the arrow-marked direction. For example, when a shift command in the direction opposite to the arrow-marked direction is given, the domain pattern on the corresponding cell remains unmoved. As shown in FIG. 4(D), no line is connected as indicated by numeral 431 when the two-way shift to the adjacent cells are inhibited. Then, the cell shown in FIG. 4(B) makes the two-way shift to the adjacent cells in upper, lower, right and left directions possible. While the cell in FIG. 4 (C) permits the two-way shift in upper and lower directions as well as in right direction, but not in left direction. In FIG. 4(D), the cell has no connections to the upper, lower and right adjacent cells, thus allowing only the rightward domain shift from its left adjacent cell.

FIG. 5 shows the one-dimensional propagating circuit. In FIG. 5(A) which shows the circuit with the capability of both right and left shifts, cells are arranged one-dimensionally. This circuit permits domains to be propagated in two-way shift in right and left directions, and such function has never been brought about in the prior art without reversal of direction of a rotating magnetic field. The present circuit is provided with independent paths for two-way propagation and thus obviating the conventional means for inverting the rotating magnetic field.

Figure 5A:
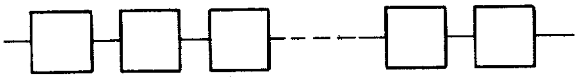
FIG. 5 shows a diagram of a third embodiment of the invention.
Figure 5B:
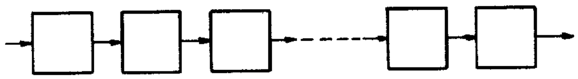
Figure 5C:
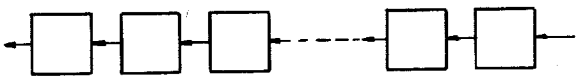

FIGS. 5(B) and 5(C) show the arrangements in which the leftward shift and the rightward shift are inhibited, respectively. These circuits perform unidirectional domain shifts in the right and left directions, respectively, and are characterized in that the circuit in FIG. 5(B) is in hold state when upper, lower and left shift pulses are applied thereto, and the circuit in FIGS. 5(C) in hold state also when upper, lower and right shift pulses are given thereto.

Figure 5D:
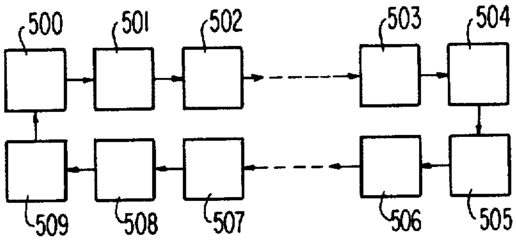

In FIG. 5(D) which shows one example of the domain propagating circuit forming a circulating memory and comprising cells which allow domain shifts only in right, lower left and upper directions, respectively, this circuit operates in the modes of rightward shift, downward shift, leftward shift, and upward shift applied in succession. Cells 500 through 503 operate by the rightward shift to transfer the domain patterns in these cells to the cell 501 through a cell 504. The domain pattern on the cell 504 is moved to a cell 505 by the downward shift. During this operation, it is indispensable to prepare spaces (i.e., the states where no domains exist) for the cells 504 and 505 before the rightward and downward shift operations. In the leftward shift mode, the domains (or data) in the cells 505 through 508 are shifted to the cells 506 through 509. Then, in the upward shift mode, the data in the cell 509 is propagated to the cell 500. In these operations, it is required to provide spaces for the cells 509 and 500 before the leftward and rightward shifts. Thus, each time the shift mode circulates by way of right-lower-left-upper paths, the domain pattern on each cell shifts by one bit whereby a closed loop domain circuit is formed. The one-dimensional domain propagating circuits shown in FIGS. 5(A) through 5(D) are adaptable for memory and logic circuits.

Figure 6:
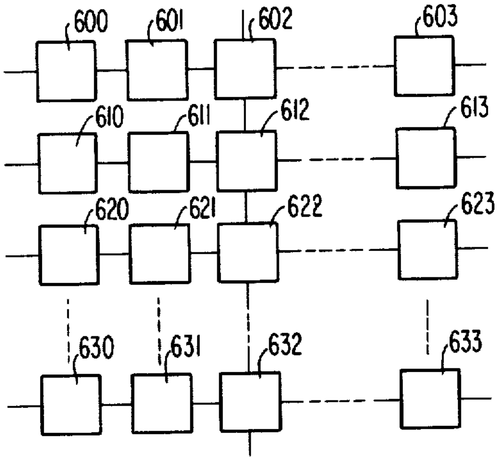
FIG. 6 shows a diagram of a fourth embodiment of the invention.

In FIG. 6 which shows one example of the two-dimensional domain propagating circuit, the circuit comprises cells (as shown in FIG. 5(A)) which permit domains to be shifted bidirectionally. In FIG. 6, cells 600 through 603, 610 through 613, 620 through 623, and 630 through 633 constitute the lateral propagating circuits, respectively, which operate under the right and left shift modes. Among these cells, the cells 602, 612, 622 and 632 form a propagating circuit longitudinally operable under the upper and lower shift modes. Thus, under the right and left shift modes, the whole propagating circuit operates to shift domains in the right and left directions. While under the upper and lower shift modes, only the longitudinal propagating circuit having the cells 602, 612, 622 and 632 operates to shift the domains in the longitudinal directions. In this manner, the propagating circuits can be selectively driven whereby various useful memory and logic circuits are made available. For example, the present circuit is applicable to a major-minor loop type memory. More definitly, in FIG. 6, assuming that the lateral propagating circuits correspond to the memory loops for minor loops, and the longitudinal propagating circuit corresponds to the major loop, the memory location is selected by shifting the data to the longitudinal propagating circuit position in the right and left shift modes, and the data in the longitudinal propagating circuit is transferred to the input-output position in the upper and lower shift modes whereby read and write operations are performed. The input and output circuits connected to the longitudinal propagating circuit is not shown in FIG. 6.

This type of memory, compared with the conventional major-minor type memory, has several advantages such that (1) the construction of the propagating circuit is simpler, (2) the major-minor loop can operate independently, (3) the major-minor loop can be stopped or restarted for bidirectional shift and, as a result, (4) the so-called dynamic ordering technique can easily be applied to both major loop and minor loop. The use of such memory facilitates the manufacture of higher speed and lower cost memory devices. The major-minor loop system using bubble domain is described in "IEEE TRANSACTIONS ON MAGNETICS," Vol. 6, pages 447 to 451, Sept. issue, 1970. Also, such dynamic ordering technique is described in "Digests of the Intermag Conference," page 58.2, Apr. issue, 1972. The two-dimensional domain propagating circuit is not limited to one example shown in FIG. 6, but another circuit including the cells which make unidirectional shift possible may be used in place of the circuit arrangement shown in FIG. 6.

Figure 7A:
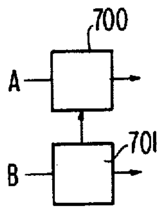
FIG. 7 shows a diagram of a logic circuit using the domain propagating circuit of this invention.
Figure 7B:
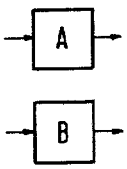
Figure 7C:
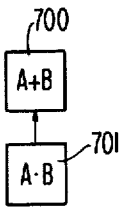

FIG. 7 shows the simplest logic circuit comprising the domain propagating circuit of the invention. In FIG. 7(A), cells 700 and 701 from the propagating circuit wherein the domain shift is partially limited (no right and left adjacent cells are shown). Assuming here that domain patterns A and B are introduced into the cells 700 and 701 from the left adjacent cells in the rightward shift mode, the state under this control is shown in FIG. 7(B) since the longitudinal shift is inhibited. Then, in the upper shift mode, the domain pattern in the cell 700 is retained therein since the upper shift is inhibited in the cell 700. On the other hand, the domain pattern B in this cell 701 tends to move to the upper cell 700 because the upper shift is not inhibited in the cell 701. However, because the cell 700 is occupied with the domain pattern A, the domain pattern B is under the influence of the domain pattern A, and retained still in the cell 701. It is assumed here that the presence and absence of domain patterns A and B correspond to binary data 1 and 0, respectively. If A is 1 and B is 1, the domains A and B repel each other. As a consequence, the domain B cannot give to the cell 700 and remain in the cell 701. While if the domain B is 0, or no domain is present, the states of these cells remain unchanged. However, if A is 0, there is no repelling force exerted on the domain in the cell 701. Hence, it becomes possible for the domain pattern B to move from the cell 701 to 700. In other words, this circuit constructs an arranging circuit (or adding circuit) for arranging the domains in alignment along cells in upper-to-lower order under the upper shift mode. In such circuit, OR logic (A + B) is obtained in the cell 700, and AND logic (A · B) is obtained in the cell 701 as shown in FIG. 7(C). This arranging circuit is highly useful for analog adding circuits, threshold logic circuits and other logic circuits.

Although the present invention has been described in connection with specific embodiments based on the basic cells shown in FIG. 2(B), it is apparent that the invention is similarly applicable to other domain propagating circuits based on the cells shown in FIG. 2(C), and various modifications can be derived from these basic circuits.

The shape of the ferromagnetic piece used in the foregoing examples is not limited to what is illustrated in the drawings but other shapes may be employed to meet specific application requirements. In particular, the ferromagnetic pieces used in the foregoing embodiments may be disposed on both surfaces of the sheet as shown in FIGS. 4A to 4G of U.S. Pat. No. 3,743,851. The pulse magnetic field may be applied either uniformly or partially to the ferromagnetic piece. In short, any other suitable manner as long as a magnetic pole N is generated in a propagation path having ferromagnetic pieces in correspondence to the direction of the magnetic field applied. The means for inhibiting the propagation path for the cell is not limited to what is shown in FIG. 4, but other suitable means may be employed.

What is claimed is:

1. A magnetic domain propagating circuit comprising: a sheet of magnetic material capable of retaining domains; means for applying a biasing magnetic field normal to said sheet; means for generating in-plane magnetic fields parallel with the surface of the sheet; and at least two ferromagnetic pieces disposed adjacent said sheet; said ferromagnetic pieces being responsive to said in-plane magnetic fields for creating a magnetic pole at a position thereon dependent upon the direction of said in-plane magnetic field, whereby a domain can be held at said position, said two ferromagnetic pieces being adjacent one another thereby forming a plurality of propagation paths for domains in both directions between said two ferromagnetic pieces, each of said two pieces having a geometic center and being symmetrical about an axis drawn through said center and further comprising at least four legs extending outwardly from said center, whereby a domain is held at said center in the absence of an in-plane magnetic field above a minimum value, and whereby a domain at said center of either of said two ferromagnetic pieces may be shifted to the center of the other of said ferromagnetic pieces by the generation of in-plane magnetic field pulses.

2. A magnetic domain propagating circuit as claimed in claim 1 wherein said ferromagnetic pieces are symmetrical about an axis coincident with domain propagation direction between said ferromagnetic pieces.

3. A magnetic domain propagating circuit as claimed in claim 2 further comprising an additional plurality of ferromagnetic pieces substantially indentical to said two ferromagnetic pieces.

4. A magnetic domain propagating circuit as claimed in claim 3 wherein one group of said ferromagnetic pieces are aligned along one dimension and another group are aligned along an intersecting dimension, with one of said ferromagnetic pieces being in both said groups, and wherein said means for applying an in-plane magnetic field comprises, means for applying pulse magnetic fields of four different varieties to cause domain movement from the center of a ferromagnetic piece to the center of an adjacent ferromagnetic piece in the following four directions; (1) in a first direction along said one dimension; (2) in a second direction, opposite said first direction, along said one dimension; (3) in a third direction along said intersecting dimension; (4) in a fourth direction, opposite said third direction, along said intersecting dimension; whereby a domain at the center of a ferromagnetic piece in both said first and second pieces can be propagated in all four directions.

5. A magnetic domain propagating circuit as claimed in claim 4 wherein each said ferromagnetic piece is shaped in the form of an X with each leg of said X being of substantially the same length and with the intersection of said legs being said center.

6. A magnetic domain propagating circuit as claimed in claim 4 wherein some of said plurality of ferromagnetic pieces are placed on both sides, respectively. of said sheet.

7. A magnetic domain propagating circuit comprising, a. a sheet of magnetic material capable of retaining domains, b. means for applying a biasing field to said sheet, c. a plurality of ferromagnetic pieces disposed on at least one side of said sheet and adapted to be magnitized during the application of an in-plane magnetic field applied to said sheet, said ferromagnetic pieces being disposed in at least two intersecting lines for propagating domains in either direction along both said lines, the intersection point of said at least two intersecting lines being one of said ferromagnetic pieces, each of said ferromagnetic pieces having a geometric center and being symmetrical about an axis drawn through said center as well as each axis of propagation and further comprising at least four legs extending outwardly from said center in X-shaped fashion, whereby a domain is held at said center in the absence of an in-plane magnetic field above a minimum value, and d. means for applying in-plane magnetic pulses to cause domains located at centers of said ferromagnetic pieces to shift to adjacent ferromagnetic pieces, the direction of shift being in one of the directions along one of said intersecting lines and being dependent upon the direction of said magnetic pulses.

8. A magnetic domain propagating circuit as claimed in claim 7 wherein the movement in each direction is controlled by a particular combination of two magnetic pulses, one larger than the other.

9. A magnetic domain propagating circuit as claimed in claim 7 wherein said in-plane magnetic pulses are modulated onto a pair of out-of-phase sinusoidal in-plane magnetic fields, said sinusoidal in-plane magnetic fields being along intersecting axis.

* * * * *

UNITED STATES PATENT OFFICE
CERTIFICATE OF CORRECTION

PATENT NO. : 3,891,978

DATED : June 24, 1975

INVENTOR(S) : HARUKI KOHARA

It is certified that error appears in the above-identified patent and that said Letters Patent are hereby corrected as shown below:

IN THE SPECIFICATION:

Column 2

Line 44, "after 3A" delete "and" and insert --to--

Column 3

Line 49, delete "In Fig. 2(A)" and insert --In Figure 2 wherein Figure 2(A)--

Column 6

Line 23, after "by" delete "the" and insert --then--

Line 40, delete "fields" and insert --field--

Column 10

Line 39, delete "FIGS." and insert --FIG.--

Column 12

Line 7, delete "give" and insert --go--

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*